US008479903B2

(12) United States Patent
Yagi

(10) Patent No.: US 8,479,903 B2
(45) Date of Patent: Jul. 9, 2013

(54) HYDRAULIC CONTROL DEVICE FOR TRANSMISSION

(75) Inventor: Noriyuki Yagi, Wako (JP)

(73) Assignee: Honda Motor Co., Ltd, Tokyo (JP)

(*) Notice: Subject to any disclaimer, the term of this patent is extended or adjusted under 35 U.S.C. 154(b) by 376 days.

(21) Appl. No.: 12/908,906

(22) Filed: Oct. 21, 2010

(65) Prior Publication Data
US 2011/0094610 A1 Apr. 28, 2011

(30) Foreign Application Priority Data

Oct. 22, 2009 (JP) .................................. 2009-243918
Nov. 20, 2009 (JP) .................................. 2009-265109

(51) Int. Cl.
*F16H 61/688* (2006.01)
*F16D 25/10* (2006.01)

(52) U.S. Cl.
USPC ................... 192/3.58; 192/48.601; 74/335

(58) Field of Classification Search
USPC ........................................................ 192/3.58
See application file for complete search history.

(56) References Cited

U.S. PATENT DOCUMENTS

| 4,442,727 | A |   | 4/1984 | Young |
| 4,519,484 | A | * | 5/1985 | Nagaoka et al. ............. 192/3.58 |
| 5,240,093 | A | * | 8/1993 | Wagner et al. .............. 192/3.58 |
| 6,015,031 | A | * | 1/2000 | Dorfschmid et al. ........ 192/3.58 |
| 6,595,336 | B2 | * | 7/2003 | Harries ....................... 192/3.58 |
| 2008/0220936 | A1 |  | 9/2008 | Kobayashi et al. |

FOREIGN PATENT DOCUMENTS

| EP | 1 150 040 A2 | 10/2001 |
| JP | 57-192660 A | 11/1982 |
| JP | 2007-040408 A | 2/2007 |

OTHER PUBLICATIONS

European Search Report dated Feb. 8, 2011, issued in corresponding European Patent Application No. 10188206.6.

* cited by examiner

*Primary Examiner* — Richard M. Lorence
(74) *Attorney, Agent, or Firm* — Westerman, Hattori, Daniels & Adrian, LLP

(57) ABSTRACT

A hydraulic control device for a transmission is provided. The hydraulic control device regulates hydraulic pressure from an oil pressure source to generate line pressure, and selectively applies the generated line pressure to at least two kinds of controlled objects. The hydraulic control device includes: linear solenoid valves each controlling hydraulic pressure to the line pressure in accordance with electromagnetic force of a solenoid; and switching valves each selectively switching at least two kinds of controlled objects to apply the hydraulic pressure applied from the corresponding linear solenoid valve to the switched controlled object. The hydraulic control device further includes a feedback oil passage provided for each of the switching valves. The feedback oil passage is branched from one of a plurality of output oil passages of the corresponding switching valve. The feedback oil passage is connected to a feedback port of the linear solenoid valve.

2 Claims, 4 Drawing Sheets

HYDRAULIC CONTROL DEVICE FOR TRANSMISSION

CROSS-REFERENCE TO RELATED APPLICATION

The present disclosure relates to subject matter contained in Japanese Patent Application No. 2009-243918, filed on Oct. 22, 2009, and No. 2009-265109, filed on Nov. 20, 2009, the disclosure of which is expressly incorporated herein by reference in their entirety.

BACKGROUND OF THE INVENTION

1. Field of the Invention

The present invention relates to a hydraulic control device for a transmission capable of controlling plural kinds of controlled objects by means of one switching valve.

2. Description of the Related Art

Heretofore, in a transmission for a vehicle, shift control of the transmission is carried out by switching power transmission routes for transmitting driving force from a driving source (engine) to drive wheels using friction clutches (frictional engagement elements), brake, a belt or a chain, a dog of a synchromesh mechanism (selector device), a one-way clutch or the like, for example.

Of the elements (parts) as described above, each of the friction clutch, the brake, the belt and the chain normally carries out ON/OFF or switching control by controlling pressing power (suppress strength) of a piston or the like by hydraulic pressure. On the other hand, the dog of the synchromesh mechanism controls ON/OFF or switching control by causing its position to carry out stroke movement by means of a shift fork or the like.

Now, a so-called twin clutch transmission, capable of switching a plurality of gears by dividing a transmission system constructed by combination between two clutches and a plurality of synchromesh mechanisms into two systems and switching the two systems, has been proposed and put to practical use (for example, see Japanese Patent Application Publication No. 2007-40408 (hereinafter, referred to as "Patent Literature 1")).

In such a twin clutch transmission, shift control is particularly carried out by controlling switching of friction clutches and synchromesh mechanisms. A hydraulic control device for a transmission carries out switching control using hydraulic pressure of hydraulic oil for controlling suppress strength, but using a flow rate of the hydraulic oil for controlling stroke movement.

Here, in the hydraulic control device for the transmission disclosed in Patent Literature 1, a solenoid valve for controlling hydraulic pressure is used to control engagement and disengagement of each clutch, and a solenoid valve for controlling a flow rate is used to control stroke of each synchromesh mechanism.

However, in the case where a solenoid valve (ON/OFF switching valve) is used in each of a clutch and a synchromesh mechanism like the hydraulic control device for the transmission disclosed in Patent Literature 1, this cases the number of components (parts) to be increased in the whole hydraulic control device. Increase in the number of components causes not only cost increase in the hydraulic control device but also cost increase in the whole vehicle. In addition, this also causes increase in weight of the hydraulic control device and the vehicle. In particular, there is a problem that these defects become apparent in the case of providing a large number of gears.

SUMMARY OF THE INVENTION

The present invention is made in view of the above points, and it is an object of the present invention to provide a hydraulic control device for a transmission capable of reducing the number of components of the hydraulic control device and of reducing manufacturing costs and weight of the hydraulic control device by appropriately controlling a suppress strength (hydraulic pressure) controlled object and a stroke movement controlled object by means of one switching valve.

In order to solve the problem described above, the present invention is directed to a hydraulic control device for a transmission. The hydraulic control device for the transmission according to the present invention is a hydraulic control device (2) for a transmission, which regulates hydraulic pressure from an oil pressure source (P) to generate line pressure (PL), and selectively supplies the generated line pressure (PL) to at least two kinds of controlled objects (in the present embodiment, first and second clutches 21, 22 and first to fourth hydraulic servos 71, 73).

The hydraulic control device includes linear solenoid valves (81, 82) each controlling hydraulic pressure to the line pressure (PL) in accordance with electromagnetic force of a solenoid of the corresponding linear solenoid valve (81, 82).

The hydraulic control device also includes switching valves (83, 84) each of which selectively switches at least the two kinds of controlled objects (21, 22, 71, 73) to supply the hydraulic pressure applied from the corresponding linear solenoid valve (81, 82) to the switched controlled object.

In this case, a feedback oil passage (109, 113) is provided for each of the switching valves (83, 84), the feedback oil passage (109, 113) is branched from one of a plurality of output oil passages (107, 108, 111, 112) of the corresponding switching valve (83, 84) and is connected to a feedback port (81c, 82c) of the corresponding linear solenoid valve (81, 82).

According to the hydraulic control device for the transmission of the present invention, by providing the feedback oil passage on the output oil passage from the switching valve to at least one kind of controlled object in the hydraulic control device for controlling switching of at least two kinds of controlled objects by means of the switching valve (in the embodiments, shift valve) provided in a latter part of the linear solenoid valve, it is possible to control at least two kinds of controlled objects appropriately. By reducing the number of components of the hydraulic control device, it is possible to reduce manufacturing costs and weight of the hydraulic control device.

In the hydraulic control device for the transmission according to the present invention, it is preferable that at least the two kinds of controlled objects include a friction clutch (21, 22) caused to engage and disengage in response to application of the hydraulic pressure and a shift actuator (71, 73) that causes a coupling sleeve to slide by means of supply of a flow rate of the oil, and that the feedback oil passage (109, 113) is branched from an output oil passage (108, 112) provided at a side of the friction clutch (21, 22). This makes it possible to prevent delay in response of hydraulic pressure control, and to ensure a suitable flow rate in flow rate control.

In this regard, reference numerals in parenthesis described above exemplify, for reference, corresponding components of an embodiment (will be described later).

According to the present invention, by appropriately controlling a suppress strength (hydraulic pressure) controlled object and a stroke movement controlled object by means of one switching valve, it is possible to reduce the number of components of the hydraulic control device, and it is also possible to reduce manufacturing costs and weight of the hydraulic control device.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings.

DETAILED DESCRIPTION OF THE INVENTION

Hereinafter, a preferred embodiment of a hydraulic control device for a transmission according to the present invention will be described in detail with reference to the appending drawings.

Figure 1:
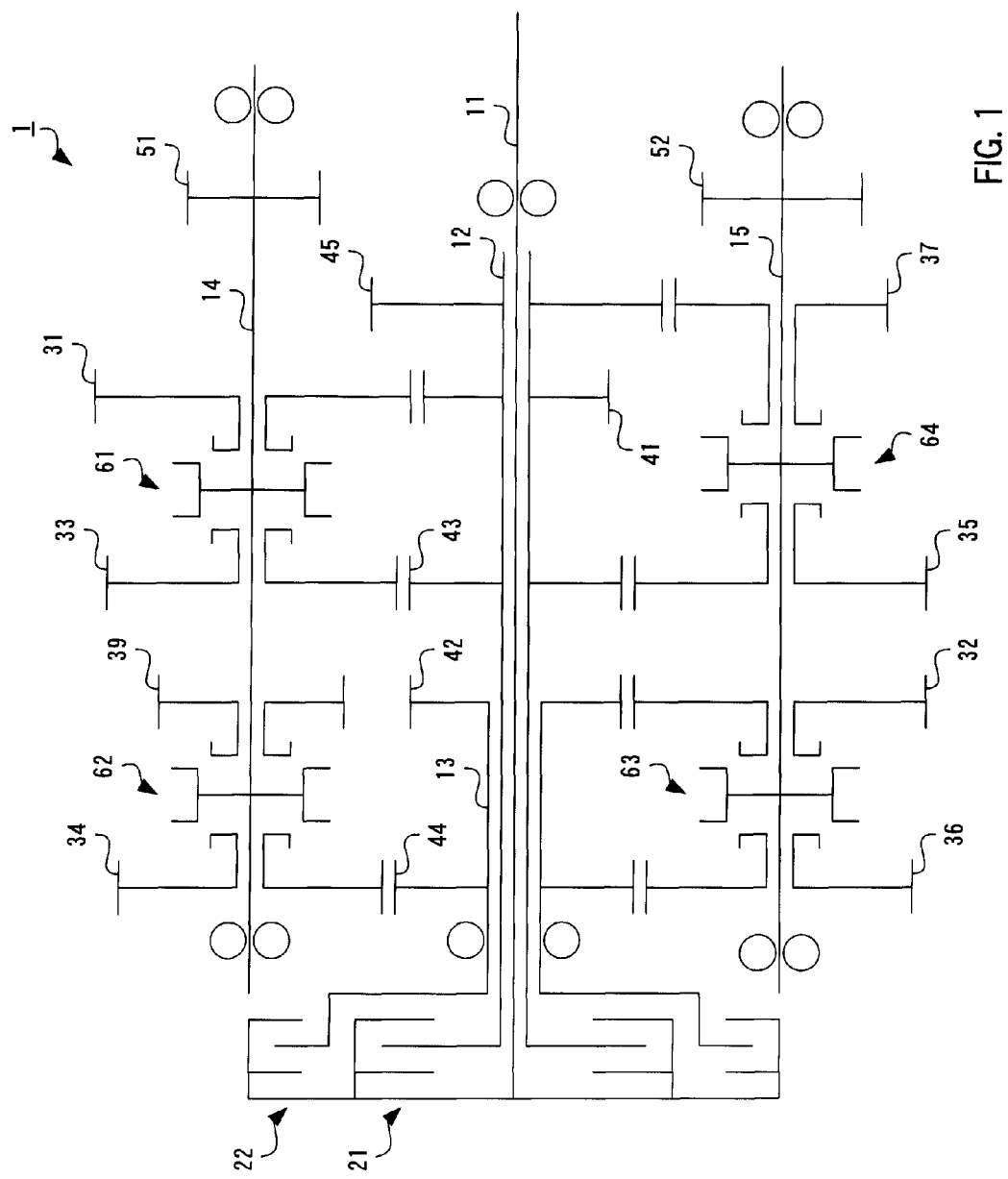
FIG. 1 is a skeleton diagram of a twin clutch transmission to which a hydraulic control device for a transmission according to the present invention is applied.

A configuration of a transmission to which a hydraulic control device for a transmission according to one embodiment of the present invention is applied will first be described. FIG. 1 is a skeleton diagram of a twin clutch transmission to which the hydraulic control device for the transmission according to the present invention is applied. A twin clutch transmission 1 shown in FIG. 1 is a kind of automatic transmission having seven forward gears and one reverse gear, and carries out gear shifting control via a hydraulic control device (will be described later) on the basis of control from an electronic control unit (not shown in the drawings, which will be referred to as an "ECU").

The twin clutch transmission 1 according to the present embodiment is a twin clutch transmission with two drive shafts and two output shafts. The twin clutch transmission 1 includes: an input shaft 11; a hollow first drive shaft 12 arranged coaxially with the input shaft 11; a hollow second drive shaft 13 arranged coaxially with the input shaft 11 and the first drive shaft 12; a first output shaft 14 arranged parallel to the input shaft 11, the first and second drive shafts 12, 13; and a second output shaft 15 arranged parallel to the input shaft 11, the first and second drive shafts 12, 13 and the first output shaft 14.

The input shaft 11 is connected to a crank shaft of a driving source (that is, an engine, not shown in the drawings) via a torque converter, for example. In this regard, since it is not an essential part of the present invention, the twin clutch transmission 1 may be configured so that the input shaft 11 is directly connected to the crank shaft of the engine without provision of the torque converter.

The first drive shaft 12 is arranged around the input shaft 11 and coaxially with the input shaft 11. When a first clutch 21 and engages, the first drive shaft 12 is selectively connected to the input shaft 11. Further, the second drive shaft 13 is arranged around the first drive shaft 12 and coaxially with the input shaft 11 and the first drive shaft 12. When a second clutch 22 engages, the second drive shaft 13 is selectively connected to the input shaft 11.

Each of the first clutch 21 and the second clutch 22 is a well-known wet type multiplate clutch, for example. However, each of these clutches 21, 22 may be a dry type multiplate clutch, which contributes to improvement of fuel economy of a vehicle. Hereinafter, the first and second clutches 21, 22 are also collectively called friction clutches.

A seventh drive gear 45, a first (LOW) drive gear 41 and a third-fifth drive gear 43 are fixed to the first drive shaft 12 in order from an input side (right side in FIG. 1). A second-reverse drive gear 42 and a fourth-sixth drive gear 44 are fixed to the second drive shaft 13 in order from the input side.

A first final drive gear 51 is fixed to the first output shaft 14, and a first driven gear 31, a third driven gear 33, a reverse driven gear 39 and a fourth driven gear 34 are rotatably provided in order from the right side of FIG. 1. A synchromesh mechanism (selector device) 61 is provided between the first driven gear 31 and the third driven gear 33, and a synchromesh mechanism 62 is provided between the reverse driven gear 39 and the fourth driven gear 34.

When a coupling sleeve of the synchromesh mechanism 61 is caused to slide to the right in FIG. 1, the first driven gear 31 is selectively connected to the first output shaft 14. Similarly, when this coupling sleeve is caused to slide to the left, the third driven gear 33 is selectively connected to the first output shaft 14. Further, when a coupling sleeve of the synchromesh mechanism 62 is caused to slide to the right in FIG. 1, the reverse driven gear 39 is selectively connected to the first output shaft 14. Similarly, when this coupling sleeve is caused to slide to the left, the fourth driven gear 34 is selectively connected to the first output shaft 14.

A second final drive gear 52 is fixed to the second output shaft 15, and a seventh driven gear 37, a fifth driven gear 35, a second driven gear 32 and a sixth driven gear 36 are rotatably provided in order from the right side of FIG. 1. A synchromesh mechanism 64 is provided between the seventh driven gear 37 and the fifth driven gear 35, and a synchromesh mechanism 63 is provided between the second driven gear 32 and the sixth driven gear 36.

When a coupling sleeve of the synchromesh mechanism 63 is caused to slide to the right in FIG. 1, the second driven gear 32 is selectively connected to the second output shaft 15. Similarly, when this coupling sleeve is caused to slide to the left, the sixth driven gear 36 is selectively connected to the second output shaft 15. Further, when a coupling sleeve of the synchromesh mechanism 64 is caused to slide to the right in FIG. 1, the seventh driven gear 37 is selectively connected to the second output shaft 15. Similarly, when this coupling sleeve is caused to slide to the left, the fifth driven gear 35 is selectively connected to the second output shaft 15.

The first driven gear 31 always engages with the first drive gear 41. The third driven gear 33 and the fifth driven gear 35 always engage with the third-fifth drive gear 43. The second driven gear 32 always engages with the second-reverse drive gear 42. The fourth driven gear 34 and the sixth driven gear 36 always engage with the fourth-sixth drive gear 44. Further, the first final drive gear 51 and the second final drive gear 52 engage with a final driven gear (ring gear) of a differential mechanism (not shown in the drawings).

Figure 2:
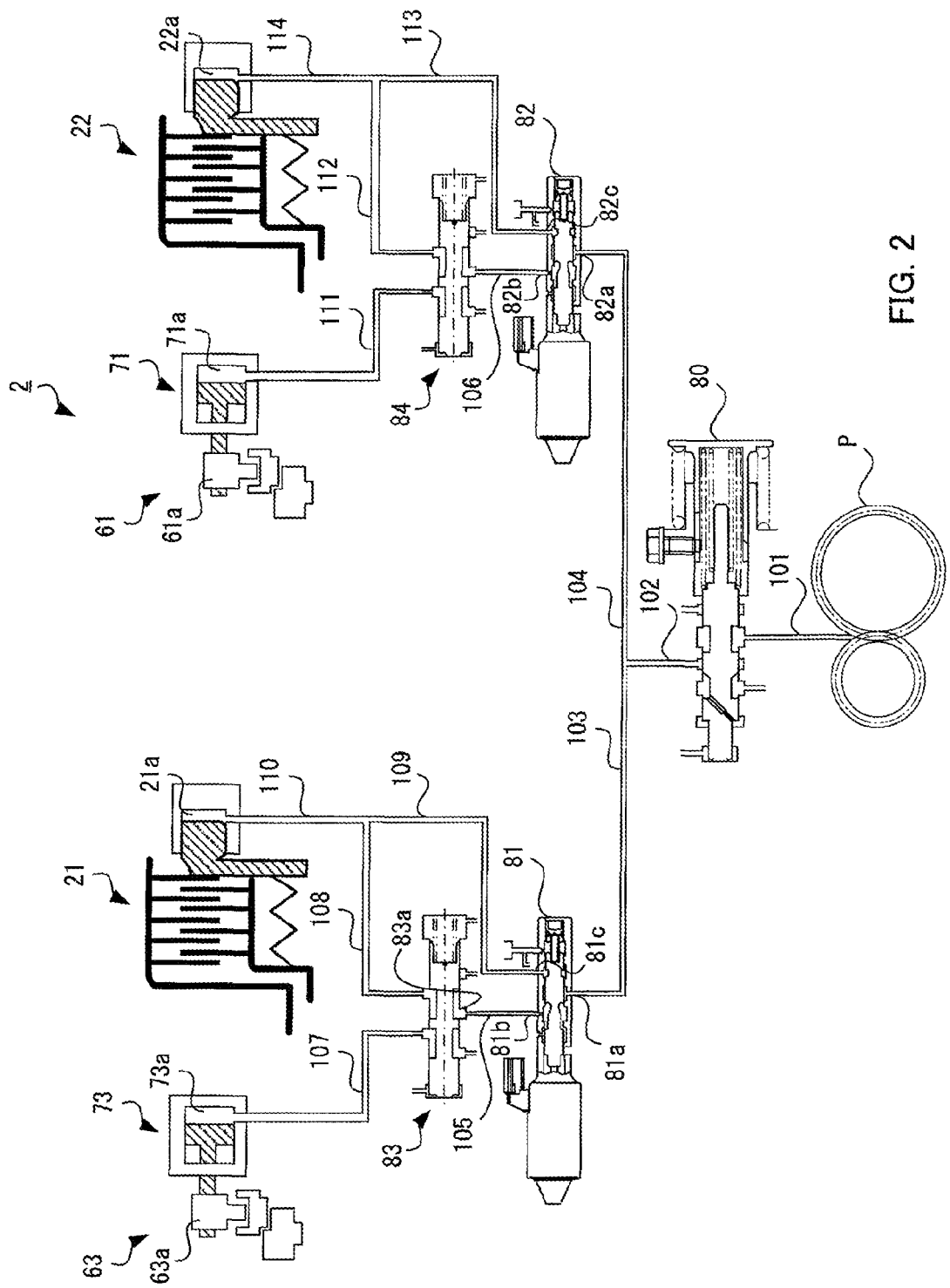
FIG. 2 is a hydraulic circuit diagram showing a part of the hydraulic control device for the transmission according to the present invention.

Next, a hydraulic control device for controlling drive of the clutches 21, 22 and the synchromesh mechanisms 61 to 64 of the twin clutch transmission 1 according to the present embodiment will be described. FIG. 2 is a hydraulic circuit diagram showing a part of a hydraulic control device 2 for the twin clutch transmission 1 according to the present invention.

The hydraulic control device 2 according to the present embodiment includes a manual valve, a plurality of shift valves, a plurality of on/off solenoid valves and the like other than the components shown in FIG. 2. However, since it directly has no relationship to characterizing portions of the present invention, detailed illustration of the hydraulic circuit diagram of the hydraulic control device 2 is omitted, and explanation for ones that has no relationship to the present invention is also omitted. In this regard, since an operation of each of linear solenoid valves 81, 82 is substantially the same as each other, the operation of the first linear solenoid valve 81 will be described.

As shown in FIG. 2, the hydraulic control device 2 according to the present embodiment includes at least: an oil pump P; a regulator valve 80; the first and second linear solenoid valves 81, 82; first and second shift valves (switching valves) 83, 84; and first to fourth hydraulic servos (shift actuators) 71 to 74.

In this regard, the first to fourth hydraulic servos 71 to 74 are provided so as to correspond to the synchromesh mechanisms 61 to 64. However, for the sake of convenience of explanation, only the first and third hydraulic servos 71, 73 are shown in FIG. 2. Further, the first and second shift valves 83, 84 are illustrated as one example of a switching valve for switching oil passages. For that reason, the switching valve of the present invention is not limited to a shift valve, and it may be an on/off solenoid valve or the like that can switch ON/OFF thereof by means of a control signal, for example.

The hydraulic control device 2 for the transmission according to the present embodiment includes feedback oil passages 109, 113. The feedback oil passages 109, 113 are respectively branched from oil passages 108, 112 for supplying hydraulic oil from the first and second shift valves 83, 84 to oil chambers 21a, 22a of the first and second clutches 21, 22, and are respectively connected to feedback ports 81c, 82c of the first and second linear solenoid valves 81, 82. This makes it possible to control a flow rate to each of the first to fourth hydraulic servos 71 to 74, and to appropriately control hydraulic pressure to each of the first and second clutches 21, 22. For that reason, there is no need to respectively provide switching valves for the first and second clutches 21, 22 unlike a conventional one, and it is possible to control two kinds of controlled objects (that is, a target object for controlling hydraulic pressure and a target object for controlling a flow rate) by means of one switching valve. As a result, by reducing the number of valves of the hydraulic control device 2, it is possible to reduce manufacturing costs and weight thereof.

More specifically, in the case where no feedback oil passage is provided in the oil passage to each of the clutches 21, 22, a position of a spool in each of the linear solenoid valves 81, 82 is controlled on the basis of a balance between driving force of a solenoid thereof that can vary in response to a supplied current and a load of a spring embedded therein (that is, spring load). This makes it possible to appropriately control a flow rate for supplying a flow rate controlled object.

On the other hand, in the case where the feedback oil passages 109, 113 are provided in the oil passages of the clutches 21, 22, driving force by hydraulic pressure applied to a feedback area of the spool from the feedback port side is generated in addition to the driving force of the solenoid and the spring load as described above. The position of the spool in each of the linear solenoid valves 81, 82 is controlled on the basis of a balance of them. This makes it possible to regulate hydraulic pressure applied from each of the linear solenoid valves 81, 82 in accordance with the driving force due to the feedback area, and it is possible to appropriately control hydraulic pressure to be applied.

The oil pump P is driven by the engine (not shown in the drawings) to suck hydraulic oil from an oil tank (not shown in the drawings) and to pump the suctioned hydraulic oil to an oil passage 101. The regulator valve 80 regulates the hydraulic oil supplied from the oil pump P to generate line pressure PL in oil passages 102, 103, 104. This line pressure PL is applied to input ports 81a, 82a of the first and second linear solenoid valves 81, 82 via the manual valve (not shown in the drawings).

Figure 3B:
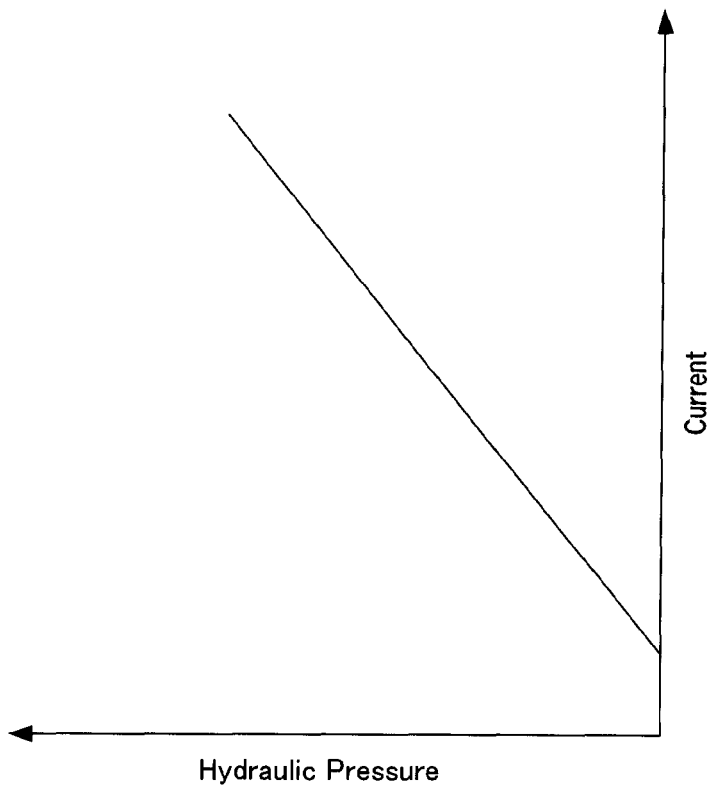
FIGS. 3A and 3B are graphs showing characteristics of a normal close type linear solenoid valve.
Figure 3A:
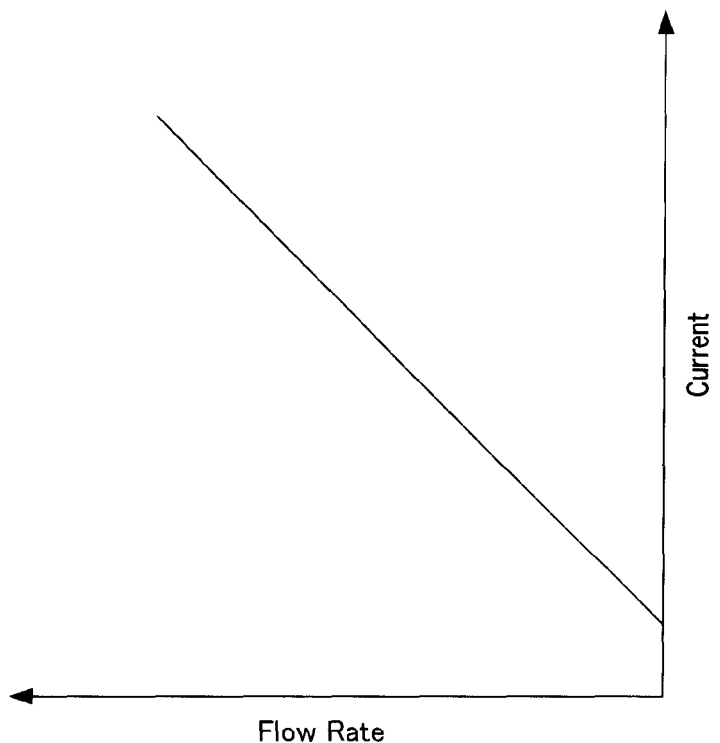

Each of the linear solenoid valves 81, 82 is controlled by an electronic control unit, ECU (not shown in the drawings). In the present embodiment, each of the first and second linear solenoid valves 81, 82 is a normal close type one. Therefore, as shown in FIG. 3, when a current to be supplied to each of the linear solenoid valves 81, 82 from the ECU becomes a predetermined threshold value or more, the corresponding linear solenoid valve 81, 82 opens linearly. Thus, hydraulic pressure and/or a flow rate of hydraulic oil outputted from each of the linear solenoid valves 81, 82 are controlled in accordance with a supplied current value.

In this regard, although the normal close type linear solenoid valve has been illustrated in the present embodiment, a normal open type one may be utilized in the hydraulic control device for the transmission according to the present invention. In this case, the linear solenoid valve has pump characteristics in which hydraulic pressure and/or a flow rate linearly decrease in accordance with a supplied current value.

The first linear solenoid valve 81 supplies hydraulic oil with line pressure PL to the first shift valve 83 via an output port 81b in accordance with magnitude of the supplied current. Similarly, the second linear solenoid valve 82 supplies hydraulic oil to the second shift valve 84 via output port 82b and oil passage 106 in accordance with magnitude of the supplied current. In the case of the configuration shown in FIG. 2, control pressure is not applied to a far left port of the first shift valve 83. For this reason, a spool is pressed to the left by means of a spring, and the first shift valve 83 becomes a set state. In this case, hydraulic pressure applied to an input port 83a of the first shift valve 83 is applied to an oil passage 108 via a spool channel of the first shift valve 83.

An oil passage 110 branched from the oil passage 108 is connected to the oil chamber 21a of the first clutch 21, and the hydraulic oil supplied to this oil passage 110 causes the first clutch 21 to engage. At this time, feedback hydraulic pressure is applied to the feedback port 81c of the first linear solenoid valve 81 via a feedback oil passage 109 branched from the oil passage 108. Thus, the hydraulic pressure regulated on the basis of feedback in the first linear solenoid valve 81 can be applied to the oil chamber 21a of the first clutch 21.

On the other hand, when the control pressure is applied to the far left port of the first shift valve 83, the spool moves to the right against biasing force of the spring, and the first shift valve 83 becomes an operation state. In this case, hydraulic pressure applied to the input port 83a of the first shift valve 83 is applied to an oil passage 107 via the spool channel of the first shift valve 83. Here, the hydraulic oil (hydraulic pressure) supplied to the oil passage 107 flows into an oil chamber 73a of the third hydraulic servo 73, and a shift fork 63a of the synchromesh mechanism 63 is thereby pressed to the left in FIG. 2. Thus, the synchromesh mechanism 63 is fitted into the sixth driven gear 36.

Next, a gear shifting operation of the twin clutch transmission 1 according to the present embodiment and an operation of the hydraulic control device 2 at that time will be described briefly using the skeleton diagram of FIG. 1 and the hydraulic circuit diagram of FIG. 2.

First, in the case where the gear is a neutral range (N range) or a parking range (P range), both the first and second clutches 21, 22 are in a disengaging state. The synchromesh mechanisms 61 to 64 are also in an inactive (disengaging) state. At this time, both the first and second linear solenoid valves 81, 82 are also turned OFF.

When a shift lever (not shown in the drawings) is shifted from the N range to a D range, a gear shifting command to a first gear is first outputted to the twin clutch transmission 1 from the ECU. In the setup of the first gear, when a current is supplied to the first linear solenoid valve 81 in the state where the first shift valve 83 is in a set state, hydraulic pressure is applied to the oil chamber 21a of the first clutch 21 via the first linear solenoid valve 81 and the first shift valve 83. Thus, the first clutch 21 is caused to engage, and the first drive shaft 12 is thereby connected to the input shaft 11.

Further, the second shift valve 84 becomes an operation state. When a current is supplied to the second linear solenoid valve 82, hydraulic oil is supplied to an oil chamber 71a of the first hydraulic servo 71 via the second linear solenoid valve 82 and the second shift valve 84. By causing a shift fork 61a of the synchromesh mechanism 61 to move, the coupling sleeve of the synchromesh mechanism 61 is caused to slide to the right in FIG. 1. Thus, the first driven gear 31 is thereby connected to the first output shaft 14.

Thus, driving force from the engine allows the first output shaft 14 to be driven with a predetermined reduction gear ratio via the input shaft 11, the first clutch 21, the first drive shaft 12, the first drive gear 41 and the first driven gear 31. The driving force of the first output shaft 14 is transmitted to right and left drive wheels via the first final drive gear 51 and the differential mechanism (not shown in the drawings) to drive the drive wheels using the first gear (LOW).

When vehicle speed increases and a shift up command to a second gear is outputted from the ECU to the twin clutch transmission 1, the second shift valve 84 is switched from the operation state to a set state. When a current is supplied to the second linear solenoid valve 82, hydraulic pressure is applied to the oil chamber 22a of the second clutch 22 via the second linear solenoid valve 82 and the second shift valve 84. Thus, the second clutch 22 is caused to engage, and the second drive shaft 13 is thereby connected to the input shaft 11.

Further, when the first shift valve 83 is switched from the set state to an operation state and a current is supplied to the first linear solenoid valve 81, hydraulic oil is supplied to the oil chamber 73a of the third hydraulic servo 73 via the first linear solenoid valve 81 and the first shift valve 83. By causing the shift fork 63a of the synchromesh mechanism 63 to move, the coupling sleeve of the synchromesh mechanism 63 is caused to slide to the right in FIG. 1. Thus, the second driven gear 32 is thereby connected the second output shaft 15.

Thus, the driving force from the engine allows the second output shaft 15 to be driven with a predetermined reduction gear ratio via the input shaft 11, the second clutch 22, the second drive shaft 13, the second-reverse drive gear 42 and the second driven gear 32. The driving force of the second output shaft 15 is transmitted to the right and left drive wheels via the second final drive gear 52 and the differential mechanism (not shown in the drawings) to drive the drive wheels using the second gear.

Moreover, when the vehicle speed increases and a shift up command to a third gear is outputted from the ECU to the twin clutch transmission 1, the first shift valve 83 is switched from the operation state to the set state. When a current is supplied to the first linear solenoid valve 81, hydraulic pressure is applied to the oil chamber 21a of the first clutch 21 via the first linear solenoid valve 81 and the first shift valve 83. Thus, the first clutch 21 is caused to engage, and the first drive shaft 12 is thereby connected to the input shaft 11.

Further, when the second shift valve 84 is switched from the set state to the operation state and a current is supplied to the second linear solenoid valve 82, hydraulic oil is supplied to the oil chamber 71a of the first hydraulic servo 71 via the second linear solenoid valve 82 and the second shift valve 84. By causing the shift fork 61a of the synchromesh mechanism 61 to move, the coupling sleeve of the synchromesh mechanism 61 is caused to slide to the left in FIG. 1. Thus, the third driven gear 33 is thereby connected to the first output shaft 14.

Thus, the driving force from the engine allows the first output shaft 14 to be driven with a predetermined reduction gear ratio via the input shaft 11, the first clutch 21, the first drive shaft 12, the third-fifth drive gear 43 and the third driven gear 33. The driving force of the first output shaft 14 is transmitted to the right and left drive wheels via the first final drive gear 51 and the differential mechanism (not shown in the drawings) to drive the drive wheels using the third gear.

Moreover, when the vehicle speed increases and a shift up command to a fourth gear is outputted from the ECU to the twin clutch transmission 1, the second shift valve 84 is switched from the operation state to the set state. When a current is supplied to the second linear solenoid valve 82, hydraulic pressure is applied to the oil chamber 22a of the second clutch 22 via the second linear solenoid valve 82 and the second shift valve 84. Thus, the second clutch 22 is caused to engage, and the second drive shaft 13 is thereby connected to the input shaft 11.

Further, when the first shift valve 83 is switched from the set state to the operation state and a current is supplied to the first linear solenoid valve 81, hydraulic oil is supplied to an oil chamber of the second hydraulic servo (not shown in the drawings) via the first linear solenoid valve 81 and the first shift valve 83 (here, a switching valve such as a shift valve may be inserted in the middle of the oil passage 107, for example, to switch between the third hydraulic servo 73 and the second hydraulic servo). By causing a shift fork of the synchromesh mechanism 62 to move, the coupling sleeve of the synchromesh mechanism 62 is caused to slide to the left in FIG. 1. Thus, the fourth driven gear 34 is thereby connected to the first output shaft 14.

Thus, the driving force from the engine allows the first output shaft 14 to be driven with a predetermined reduction gear ratio via the input shaft 11, the second clutch 22, the second drive shaft 13, the fourth-sixth drive gear 44 and the fourth driven gear 34. The driving force of the first output shaft 14 is transmitted to the right and left drive wheels via the first final drive gear 51 and the differential mechanism (not shown in the drawings) to drive the drive wheels using the fourth gear.

Moreover, when the vehicle speed increases and a shift up command to a fifth gear is outputted from the ECU to the twin clutch transmission 1, the first shift valve 83 is switched from the operation state to the set state. When a current is supplied to the first linear solenoid valve 81, hydraulic pressure is applied to the oil chamber 21a of the first clutch 21 via the first linear solenoid valve 81 and the first shift valve 83. Thus, the first clutch 21 is caused to engage, and the first drive shaft 12 is thereby connected to the input shaft 11.

Further, when the second shift valve 84 is switched from the set state to the operation state and a current is supplied to the second linear solenoid valve 82, hydraulic oil is supplied to an oil chamber of the fourth hydraulic servo (not shown in the drawings) via the second linear solenoid valve 82 and the second shift valve 84. By causing a shift fork of the synchromesh mechanism 64 to move, the coupling sleeve of the synchromesh mechanism 64 is caused to slide to the left in FIG. 1. Thus, the fifth driven gear 35 is thereby connected to the second output shaft 15.

Thus, the driving force from the engine allows the second output shaft 15 to be driven with a predetermined reduction gear ratio via the input shaft 11, the first clutch 21, the first drive shaft 12, the third-fifth drive gear 43 and the fifth driven gear 35. The driving force of the second output shaft 15 is transmitted to the right and left drive wheels via the second final drive gear 52 and the differential mechanism (not shown in the drawings) to drive the drive wheels using the fifth gear.

Moreover, when the vehicle speed increases and a shift up command to a sixth gear is outputted from the ECU to the twin clutch transmission 1, the second shift valve 84 is switched from the operation state to the set state. When a current is supplied to the second linear solenoid valve 82, hydraulic pressure is applied to the oil chamber 22*a* of the second clutch 22 via the second linear solenoid valve 82 and the second shift valve 84. Thus, the second clutch 22 is caused to engage, and the second drive shaft 13 is thereby connected to the input shaft 11.

Further, when the first shift valve 83 is switched from the set state to the operation state and a current is supplied to the first linear solenoid valve 81, hydraulic oil is supplied to the oil chamber 73*a* of the third hydraulic servo 73 via the first linear solenoid valve 81 and the first shift valve 83. By causing the shift fork 63*a* of the synchromesh mechanism 63 to move, the coupling sleeve of the synchromesh mechanism 63 is caused to slide to the left in FIG. 1. Thus, the sixth driven gear 36 is thereby connected to the second output shaft 15.

Thus, the driving force from the engine allows the second output shaft 15 to be driven with a predetermined reduction gear ratio via the input shaft 11, the second clutch 22, the second drive shaft 13, the fourth-sixth drive gear 44 and the sixth driven gear 36. The driving force of the second output shaft 15 is transmitted to the right and left drive wheels via the second final drive gear 52 and the differential mechanism (not shown in the drawings) to drive the drive wheels using the sixth gear.

Moreover, when the vehicle speed increases and a shift up command to a seventh gear is outputted from the ECU to the twin clutch transmission 1, the first shift valve 83 is switched from the operation state to the set state. When a current is supplied to the first linear solenoid valve 81, hydraulic pressure is applied to the oil chamber 21*a* of the first clutch 21 via the first linear solenoid valve 81 and the first shift valve 83. Thus, the first clutch 21 is caused to engage, and the first drive shaft 12 is thereby connected to the input shaft 11.

Further, the second shift valve 84 is switched from the set state to the operation state. When a current is supplied to the second linear solenoid valve 82, hydraulic oil is supplied to the oil chamber of the fourth hydraulic servo via the second linear solenoid valve 82 and the second shift valve 84. By causing the shift fork of the synchromesh mechanism 64 to move, the coupling sleeve of the synchromesh mechanism 64 is caused to slide to the right in FIG. 1. Thus, the seventh driven gear 37 is thereby connected to the second output shaft 15.

Thus, the driving force of the engine allows the second output shaft 15 to be driven with a predetermined reduction gear ratio via the input shaft 11, the first clutch 21, the first drive shaft 12, the seventh drive gear 45 and the seventh driven gear 37. The driving force of the second output shaft 15 is transmitted to the right and left drive wheels via the second final drive gear 52 and the differential mechanism (not shown in the drawings) to drive the drive wheels using the seventh gear.

Further, in an operation at down shifting, a shift down operation is in turn carried out on the basis of operations contrary to those at up shifting described above. As is apparent from the above explanation, the first clutch 21 is caused to engage when any odd-numbered gear is to be set up. Further, the second clutch 22 is caused to engage when any even-numbered gear is to be set up.

On the other hand, when the shift lever is shifted from the D range to the R range or from the N range to the R range and a gear shifting command to Reverse gear is outputted from the ECU to the twin clutch transmission 1, the second shift valve 84 is switched from the operation state to the set state. When a current is supplied to the second linear solenoid valve 82, hydraulic pressure is applied to the oil chamber 22*a* of the second clutch 22 via the second linear solenoid valve 82 and the second shift valve 84. Thus, the second clutch 22 is caused to engage, the second drive shaft 13 is thereby connected to the input shaft 11.

Further, the first shift valve 83 is shifted from the set state to the operation state. When a current is supplied to the first linear solenoid valve 81, hydraulic oil is supplied to the oil chamber of the second hydraulic servo via the first linear solenoid valve 81 and the first shift valve 83. By causing the shift fork of the synchromesh mechanism 62 to move, the coupling sleeve of the synchromesh mechanism 62 is caused to slide to the right in FIG. 1. Thus, the reverse driven gear 39 is thereby connected to the first output shaft 14.

Thus, the driving force of the engine allows the first output shaft 14 to be driven with a predetermined reduction gear ratio via the input shaft 11, the second clutch 22, the second drive shaft 13, the second-reverse drive gear 42, the second driven gear 32 (or a reverse idle gear (not shown in the drawings)) and the reverse driven gear 39. At this time, the first output shaft 14 rotates in the opposite direction to that at forward driving because it is reversed by means of the second driven gear 32 (or the reverse idle gear (not shown in the drawings)). The driving force of the first output shaft 14 is transmitted to the right and left drive wheels via the first final drive gear 51 and the differential mechanism (not shown in the drawings) to drive the drive wheels in the opposite direction to that at the forward driving.

Figure 4A:
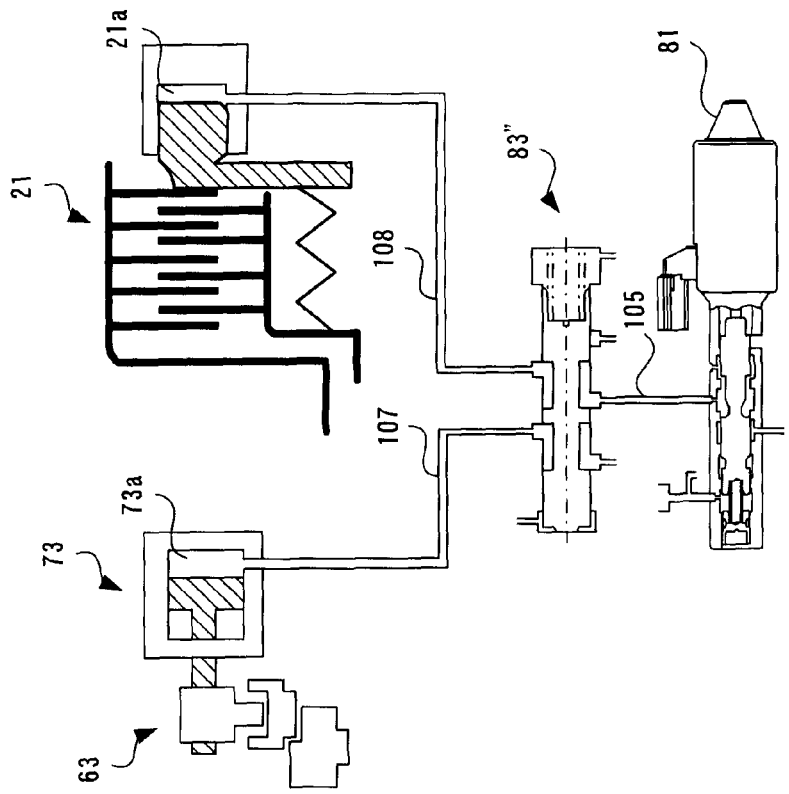
FIGS. 4A and 4B are diagrams illustrating an operation in the case where there is no feedback oil passage direct from clutches in the hydraulic circuit diagram shown in FIG. 2.
Figure 4B:
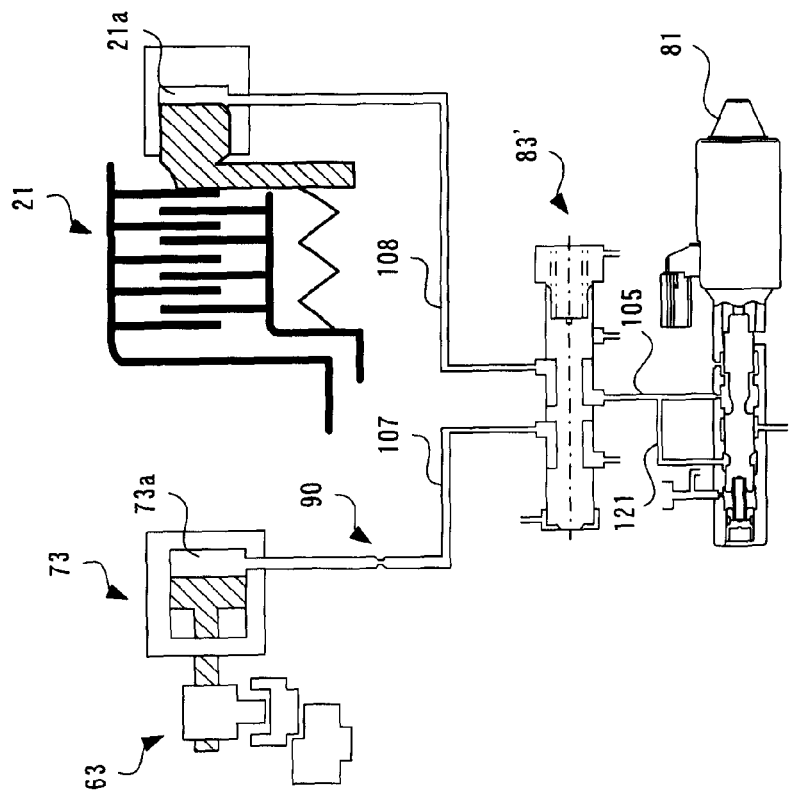

Here, superiority in the case of providing a feedback oil passage on an oil passage supplied to a hydraulic pressure controlled object will be described compared with the case of not providing such a feedback oil passage. FIGS. 4A and 4B are drawings for explaining an operation of the hydraulic control device 2 in the case where there is no feedback oil passage direct from the clutches in the hydraulic circuit diagram shown in FIG. 2. FIG. 4A shows the case where two kinds of controlled objects are controlled only by a shift valve 83' for controlling hydraulic pressure. FIG. 4B shows the case where two kinds of controlled objects are controlled only by a shift valve 83" for controlling a flow rate. In this regard, the same reference numerals are assigned to constituent elements similar to or the same as those of the hydraulic control device 2 shown in FIG. 2. Further, as well as the embodiment described above, other switching valves such as solenoid valves may be utilized in place of the shift valves.

The case where only the shift valve 83' for controlling the hydraulic pressure is used will first be described. After hydraulic oil is supplied from an oil pump (not shown in the drawings) and is regulated to line pressure PL in a regulator valve (not shown in the drawings), the hydraulic oil with the line pressure PL is supplied to an input port of the linear solenoid valve 81. When the linear solenoid valve 81 is turned ON in the state where the shift valve 83' is in a set state, the hydraulic oil supplied from the linear solenoid valve 81 is supplied to an oil passage 108 via an oil passage 105 and a spool channel of the shift valve 83'. Here, in the hydraulic circuit of the present embodiment, a feedback oil passage 121 is provided in the middle of the oil passage 105. This makes it possible to reduce delay in response to the hydraulic pressure controlled object. The hydraulic pressure applied to the oil passage 108 is applied to an oil chamber 21*a* of a first clutch 21 to cause the first clutch 21 to engage.

On the other hand, when the linear solenoid valve 81 is turned ON in the situation where the shift valve 83' is in an operation state, the hydraulic oil supplied from the linear solenoid valve 81 is supplied to an oil passage 107 via the oil passage 105 and the spool channel of the shift valve 83'. In the present embodiment, an orifice 90 is provided in the middle of the oil passage 107. By providing this orifice 90, it is possible to establish suitable pressure of the hydraulic oil even though a flow rate is enough. Conversely, since the orifice 90 becomes an essential constituent element in such a configuration, a flow rate of the hydraulic oil supplied to an oil chamber 73*a* of the hydraulic servo 73 cannot be set to high. For that reason, there is a problem that stroke speed of a shift fork 63*a* of a synchromesh mechanism 63 is restricted and delay in shift control is generated due to delay in response (delay in engagement).

Next, the case of using only the shift valve 83" for controlling a flow rate will be described. After hydraulic oil is supplied from an oil pump (not shown in the drawings) and regulated at line pressure PL by means of a regulator valve, the hydraulic oil with the line pressure PL is supplied to an input port of a linear solenoid valve 81. When the linear solenoid valve 81 is turned ON in the state where the shift valve 83" is in an operation state, the hydraulic oil supplied from the linear solenoid valve 81 is supplied to an oil passage 107 via an oil passage 105 and a spool channel of the shift valve 83". Since the switching valve is the shift valve 83" for controlling a flow rate, stroke speed of a shift fork 63*a* of a synchromesh mechanism 63 is ensured adequately.

On the other hand, when the linear solenoid valve 81 is turned ON in the state where the shift valve 83" is in a set state, the hydraulic oil supplied from the linear solenoid valve 81 is supplied to an oil passage 108 via the oil passage 105 and the spool channel of the shift valve 83". The hydraulic pressure applied to the oil passage 108 is applied to an oil chamber 21*a* of a first clutch 21, and the first clutch 21 is thereby caused to engage. Here, since necessary pressure is not established in the hydraulic oil, torque transmission to the first clutch 21 is started after invalid stroke clearing is completed, that is, after flow into a cylinder is completed (that is, a flow rate of the hydraulic oil is little in a region where control is required). In particular, in the case where flow of a minute amount of hydraulic oil into an accumulator (pressure reservoir) or the like is to be controlled, there is a problem that responsiveness of shift control and the like are deteriorated and merchantability of gear shifting of the vehicle is reduced.

As described above, the hydraulic control device 2 for the transmission according to the present invention is configured as follows. The hydraulic control device 2 for the transmission causes the regulator valve 80 to regulate the hydraulic pressure from the oil pump P, which is an oil pressure source, to generate the line pressure PL, and selectively applies the line pressure PL to any of at least two kinds of controlled objects (in the present embodiment, the first and second clutches 21, 22 and the first to fourth hydraulic servos 71, 73, which are respectively targets for controlling hydraulic pressure and a flow rate). The hydraulic control device 2 includes: the linear solenoid valves 81, 82 each controlling the line pressure PL applied from the regulator valve 80 in accordance with electromagnetic force of the embedded solenoid; and the shift valves 83, 84 each of which selectively switches at least two kinds of controlled objects to supply the hydraulic pressure applied from the corresponding linear solenoid valve 81, 82 thereto. The feedback oil passages 109, 113 respectively branched from the plurality of output oil passages 108, 112 of the shift valves 83, 84 and connected to the feedback ports 81*c*, 82*c* of the linear solenoid valves 81, 82 are provided for the shift valves 83, 84. By configuring the hydraulic control device 2 in this manner, the first or second clutch 21, 22 (friction clutch), which is a target object for controlling hydraulic pressure (suppress strength), and corresponding one of the first to fourth hydraulic servos 71, 73, which is a target object for controlling stroke movement, are appropriately controlled by means of the first or second shift valve 83, 84, which is one switching valve, whereby it is possible to reduce the number of components of the hydraulic control device 2 for the transmission and to reduce manufacturing costs and weight of the hydraulic control device 2.

Further, in the hydraulic control device 2 for the transmission according to the present invention, at least the two kinds of controlled objects may include: the first and second clutches 21, 22 (friction clutch) caused to engage and disengage in response to application of the hydraulic pressure; and the hydraulic first to fourth servos 71, 73 (shift actuator) each of which causes the corresponding coupling sleeve to slide by means of supply of the flow rate. In this case, the feedback oil passages 109, 113 may respectively be branched from the output oil passages 108, 112 of the first and second clutches 21, 22 sides. This makes it possible to prevent delay in response of hydraulic pressure control of the first and second clutches 21, 22, and it is possible to ensure an appropriate flow rate in the flow rate control of the first to fourth hydraulic servos 71, 73.

As described above, although the embodiment of the hydraulic control device for the transmission according to the present invention has been explained in detail on the basis of the appending drawings, the present invention is not limited to these configurations. Various modifications can be made in a scope of the technical idea described in the following claims, the specification described above and the appending drawings without departing from the spirit and scope of the present invention. In this regard, even any shape, structure or function that is not described directly in the specification and the drawings falls within the technical idea of the present invention so long as the function and the effect of the present invention are achieved. Namely, each component constituting the hydraulic control device 2 for the transmission can be replaced with any arbitrary component that can achieve the similar function to the corresponding component of the hydraulic control device 2 for the transmission. Further, arbitrary components may be added to the hydraulic control device 2 for the transmission.

In this regard, although the present invention has been explained using the twin clutch transmission 1 as the applied transmission in the embodiment described above, the transmission to which the hydraulic control device 2 according to the present invention is to be applied is not limited to such a twin clutch transmission. For example, the present invention can be applied to an automatic transmission (AMT: Automated Manual Transmission) including a plurality of friction clutches (regardless of whether they are wet ones or dry ones)

respectively associated with a plurality of gears and shift actuators such as synchromesh mechanisms.

Further, although the present invention has been explained using the shift valves 83, 84 as the switching valves within the hydraulic control device 2 in the embodiment described above, the switching valves applied to the present invention is not limited to the shift valves. As long as the switching valve is a switching valve capable of controlling switching of two or more kinds of controlled objects, for example, even on/off solenoid valves capable of switching ON/OFF thereof in response to a control signal of the electronic control unit (ECU) can achieve the effects of the present invention.

What is claimed is:

1. A hydraulic control device for a transmission, the hydraulic control device regulating hydraulic pressure of oil from an oil pressure source to generate line pressure, and selectively applying the generated line pressure to at least two kinds of controlled objects, the hydraulic control device comprising:

linear solenoid valves each controlling hydraulic pressure in order to apply the line pressure to a corresponding switching valve in accordance with electromagnetic force of a solenoid of the corresponding linear solenoid valve; and wherein each switching each valve selectively switches at least the two kinds of controlled objects to apply the hydraulic pressure applied from the corresponding linear solenoid valve to the switched controlled object, wherein a feedback oil passage is provided for each of the switching valves, the feedback oil passage is branched from one of a plurality of output oil passages of the corresponding switching valve and the feedback oil passage is connected to a feedback port of the corresponding linear solenoid valve.

2. The hydraulic control device for the transmission as claimed in claim 1, wherein at least the two kinds of controlled objects include a friction clutch caused to engage and disengage in response to application of the hydraulic pressure and a shift actuator that causes a coupling sleeve to slide by means of supply of a flow rate of the oil, and wherein the feedback oil passage is branched from an output oil passage provided at a side of the friction clutch.

\* \* \* \* \*